United States Patent
Kim et al.

(10) Patent No.: US 6,715,027 B2
(45) Date of Patent: Mar. 30, 2004

(54) RANKED CLEANING POLICY AND ERROR RECOVERY METHOD FOR FILE SYSTEMS USING FLASH MEMORY

(75) Inventors: Jeong-ki Kim, Taejon (KR); Seung-Min Park, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 185 days.

(21) Appl. No.: 09/967,585

(22) Filed: Sep. 28, 2001

(65) Prior Publication Data

US 2002/0116569 A1 Aug. 22, 2002

(30) Foreign Application Priority Data

Dec. 27, 2000 (KR) ........................................ 2000-83390

(51) Int. Cl.$^7$ .............................................. G06F 12/00
(52) U.S. Cl. ................................. 711/103; 365/185.11
(58) Field of Search .................................. 711/103, 202, 711/171; 714/7; 365/185.11

(56) References Cited

U.S. PATENT DOCUMENTS

| | | | |
|---|---|---|---|
| 5,404,485 A | 4/1995 | Ban | 711/202 |
| 5,544,119 A * | 8/1996 | Wells et al. | 365/185.11 |
| 5,682,497 A | 10/1997 | Robinson | 711/103 |
| 5,740,395 A * | 4/1998 | Wells et al. | 711/103 |
| 5,822,781 A * | 10/1998 | Wells et al. | 711/171 |
| 5,867,641 A | 2/1999 | Jenett | 714/7 |
| 5,933,845 A * | 8/1999 | Kopp et al. | 711/103 |
| 6,038,636 A * | 3/2000 | Brown, III et al. | 711/103 |

FOREIGN PATENT DOCUMENTS

KR 93-16877 8/1993

\* cited by examiner

*Primary Examiner*—Nasser Moazzami
(74) *Attorney, Agent, or Firm*—Blakely, Sokoloff, Taylor & Zafman (57) ABSTRACT

The present invention relates to a cleaning policy and a method for recovering error in a file system using flash memory; and, more particularly, to a ranked cleaning policy in a file system using flash memory which can be used effectively and longer by dividing it into segments, adopting the ranked cleaning policy and arranging cleaned spaces evenly, and to an error recovery method in a file system using flash memory which can recover error by subdividing cleaning status when sudden power error is caused, as well as to a computer-based recording medium for recording a program to embody the methods above. A method for ranked cleaning policy in file systems using flash memory, the method comprising the steps of: calculating rank values for all segments of the flash memory periodically; and if the storable space of the flash memory becomes less than a predetermined volume, a cleaner operating to clean invalid space of segments in order of their rank values obtained in the previous step high to low and thus to secure new storage space.

12 Claims, 6 Drawing Sheets

| SOURCE BLOCK | DESTINATION BLOCK |
| --- | --- |
| VALID | FREE |
| VALID | ALLOCATED |
| VALID | PREVALID |
| INVALID | PREVALID |
| INVALID | VALID |
| ERASING | VALID |
| FREE | VALID |

RANKED CLEANING POLICY AND ERROR RECOVERY METHOD FOR FILE SYSTEMS USING FLASH MEMORY

FIELD OF THE INVENTION

The present invention relates to a cleaning policy and a method for recovering error in file systems; and, more particularly, to a ranked cleaning policy and an error recovery method in a file system using flash memory which can be used effectively and longer by dividing it into segments, adopting ranked cleaning policy and arranging its cleaned space evenly, and also the file system using the flash memory which can recover error quickly when sudden power error is caused by subdividing the erasing status, as well as a computer-based recording medium for recording a program to embody the methods above.

DESCRIPTION OF THE PRIOR ART

The present invention concerns operating file systems using flash memories as media of recording and processing data in embedded systems such as information appliances, communication devices, set-top boxes, internet phones and the like.

The embedded systems mentioned above should keep data when power is turned off. Even in sudden power-off, they should secure data consistency. Therefore, flash memories with non-volatile property are mostly used in the embedded systems.

As information industry develops, embedded systems being developed lately refuse to stay as just simple electric devices and develop up to processing systems with a CPU inside. And more and more functions are required for these systems, making their structures more complex. This called for the real-time operating system (RTOS) to achieve the functions and to control and operate the devices, which are getting complex more and more, along with the need for file systems to run them.

To effectively manage the flash memory in embedded systems, the present invention on a file system using flash memory has been developed as well as a new cleaning policy and error recovery method.

Flash memories are stronger than other storage media, non-volatile, with fast access time, working with low electric power and small, which make them suitable for portable appliances. Flash memories have properties in common with EEPROM (Electrically Erasable Programmable ROM). That is, data in a flash memory can be deleted with electric signal and is reusable by programming or storing data therein again.

However, there are three problems using flash memory as a storage medium.

In the first place, once data are stored other data cannot be recorded therein until being cleaned. Secondly, taking 0.5–1 second to clean, it takes quite long time to delete data compared with reading time, 80 ~150 nsec/byte, and storing time, about 10 $\mu$sec/byte. Thirdly, the number of times cleaning the flash memory is limited to about 100,000 times at normal temperature.

So, to address the above problems, the number of times a flash memory is cleaned should be lessen as much as possible and the cleaning should be conducted on the memory space as evenly as possible while being cleaned. The space to be cleaned at a time is predetermined and fixed to be 64 Kbytes mostly. The space that can be cleaned at a time is called a segment.

Among prior arts for solving the problem mentioned above are the U.S. Pat. No. 5,404,485 titled Flash File System and a paper under the tile of A Flash Memory Based File System published in the USEINX, pp 155 ~164, in 1995.

The patent of Flash File System concerns a flash file system for using flash memory as a form of a disk and describes the structure for storing data in the flash memory and a method for reading and controlling data stored therein. The patent calls the erase sector an erase unit (EU), and the EU is composed of a header, block allocation map (BAM) and data block region.

The paper A Flash Memory Based File System describes a structure composing a file system with a flash memory and cleaning policy.

The file system structure of the above dissertation names the memory space to be cleaned at a time a segment, and the segment consists of segment summery and data storage space. The memory storage space is divided into data blocks, which is generally 512 Kbytes, to store data on a block basis. Data blocks are called free blocks when the segment is cleaned, valid blocks when there are useful data, and invalid blocks when the data is not useful any more thus becoming blocks that should be cleaned.

In the cleaning policy of the above prior art, Greedy method and Cost-benefit method are described. Greedy method selects a segment with least useful data block and cleans it prior to other segments, while Cost-benefit selects the segment to clean according to the formula shown below.

$$\frac{\text{benefit}}{\text{cost}} = \frac{\text{age} \times (1-u)}{2u} \qquad [\text{Formula 1}]$$

wherein u indicates the utilization coefficient of a segment, that is, the ratio of valid blocks in the segment, and $2u$ being the sum total of reading time and writing time that occur by transferring valid blocks in a segment to be cleaned to another segment, while age is the time that has passed since the block is converted into invalid block.

The conventional technologies do not effectively address the shortcomings of limited number of times in cleaning a flash memory the cleaning time taken longer than reading or writing time. Also, in case of sudden power error while moving useful data from one block to another or conducting while cleaning, there was no way to recover the data or even if there is, other problems may occur performing it.

The conventional cleaning procedures comprise the steps of searching free blocks in a destination segment that valid blocks in the segment to be cleaned will move into; copying the valid blocks in the segment to be cleaned into the free blocks found in the preceding step; converting the destination blocks into valid blocks; converting the source blocks into invalid ones; and cleaning the segment with the invalid blocks and converting it into a free segment.

However, in case power error occurs in the second step there is no way to know whether copying has begun or the data are copied to the destination blocks because the destination blocks are in free status; when error has occurred in the midst of the copying procedure and then when you try to store data in this block again, error occurs because the destination block still remains in free status; and if power error is caused in the third step, the destination block where data are copied is converted to valid block and the source block still remains valid as well, so there is a problem that we do not know which one is normal data block.

SUMMARY OF THE INVENTION

It is, therefore, an object of the present invention to provide ranked cleaning policy and a method for error recovery as well as a computer-based recording medium in file systems using a flash memory, which are capable of using the flash memory effectively and extending its life by segmenting the flash memory space, employing ranked cleaning policy and arranging spaces to clean evenly, and also capable of recovering error quickly caused by sudden power-off.

In accordance with an embodiment of the present invention, there is provided a method for ranked cleaning policy in file systems using flash memory, the method comprising the steps of: a) calculating rank values for all segments of the flash memory periodically; and b) if the storable space of the flash memory becomes less than a predetermined volume, a cleaner operating to clean invalid space of segments in order of their rank values obtained in the previous step high to low and thus to secure new storage space.

In accordance with an embodiment of the present invention, there is provided a method for power error recovery in file systems using flash memory, the method comprising the steps of: a) examining the block status for a segment of the flash memory and determining the type of blocks in instable status; b) if the results of the step a) shows the block of the segment is in allocated status, converting the status to the invalid status; c) if the results of the step a) shows the block of the segment is in prevalid status, converting the status to the valid status, and finding the source block for that block and if the source block is in valid status, converting it to invalid status; and d) if the results of the step a) shows the block of the segment is in erasing status, conducting the erasing procedure to the segment again.

In accordance with an embodiment of the present invention, there is provided a computer-based recording medium for recording a program in file systems with a processor for conducting ranked cleaning policy, the functions of: a) calculating rank values for all segments of the flash memory periodically; and b) if the storage space of the flash memory become less than a predetermined volume, the cleaner operating to secure new space by cleaning invalid space of the segment in order of their rank value high to low.

In accordance with an embodiment of the present invention, there is provided a computer-based recording medium for recording a program in file systems with a processor for power error recovery, the functions of: a) examining the block status of a segment of the flash memory and determining the type of blocks in instable status examined; b) if the results of the step a) shows the block of the segment is in allocated status, converting the status to the invalid status; c) if the results of the step a) shows the block of the segment is in prevalid status, converting the status to the valid status, and then finding its source block and if the source block is in valid status, converting it to the invalid status; and d) if the results of the step a) shows the block of the segment is in erasing status, conducting the erasing procedure to the segment again.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Other objects and aspects of the invention will become apparent from the following description of the embodiments with reference to the accompanying drawings, which is set forth hereinafter.

Figure 1:
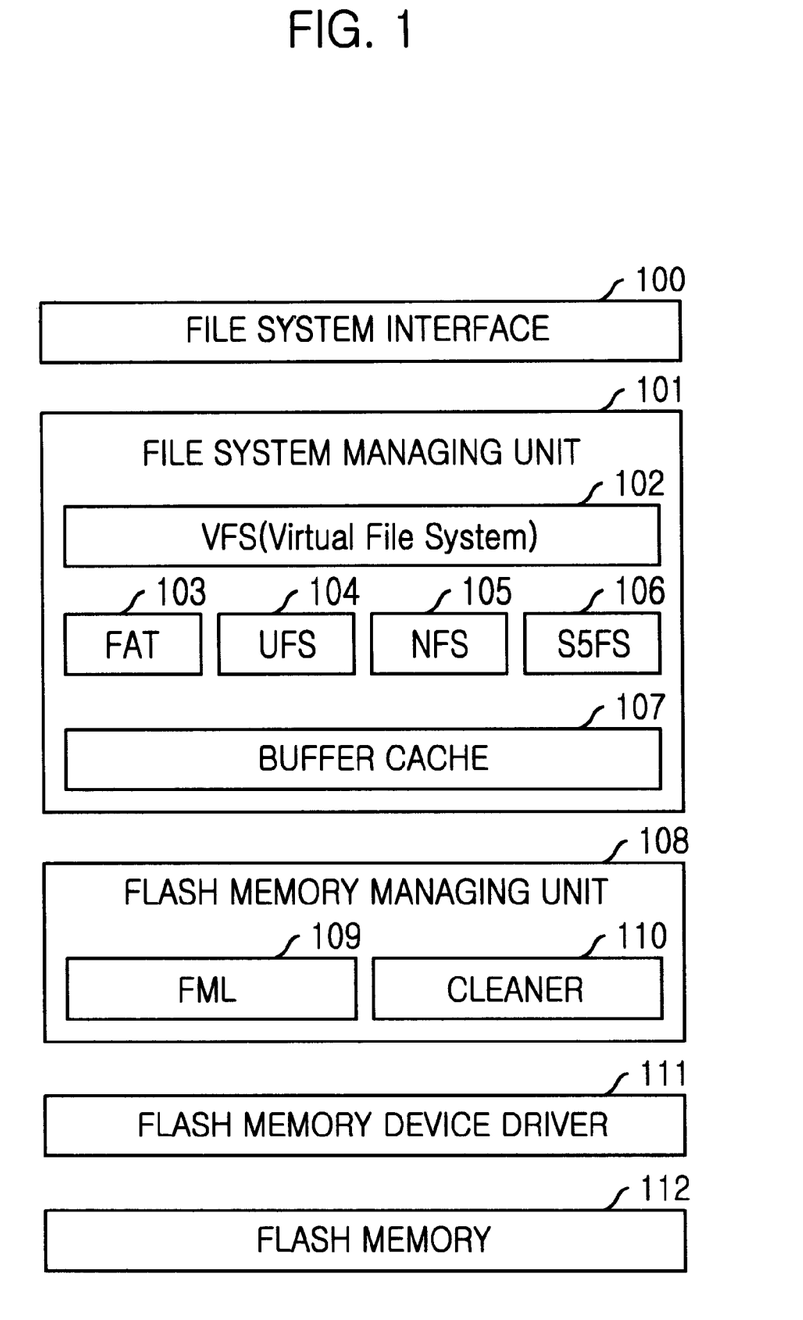
FIG. 1 is a configuration diagram showing a file system using flash memory in accordance with an embodiment of the present invention.

FIG. 1 is a configuration diagram showing a file system using flash memory in accordance with an embodiment of the present invention.

Providing the API (Application Program Interface) similar to UNIX, the file system interface 100 has extensibility of driving existing application programs almost as they are, offering consistence to users familiar with UNIX.

The file system managing unit 101 provides system related functions such as generation, initialization and deletion of a file system, and such file-related functions as generation, initialization and deletion of a file. File system manager, for instance, makes the file system managing unit 101 support plural types of file systems by using the VFS (Virtual File System) 102, which is developed by Sun Microsystems. The types of file systems supported here are the FAT (File Allocation Table) 103, the UFS (Unix File System) 104, the NFS (Network File System) 105, the S5FS (System 5 File System), etc.

In the meantime, with the buffer cache 107 placed in the lower part of the file system managing unit 101, the number of times storing data in the flash memory is reduced, thus shortening access time to data stored therein.

Buffer caches are originally used to improve response time and to process performance of a system by covering up the low speed of a disk. However, in file systems using flash memory of the present invention, these original effects of buffer caches are shrunken due to high speed of flash memories, but one thing still good is that the life span of a flash memory can be extended with this buffer cache.

When utilizing the buffer cache, data are stored in a main memory buffer instead of the flash memory. And when accessing buffers they access to the buffer in the cache memory first, thus minimizing the number of time physically writing in the flash memory.

Therefore, the number of times cleaning decreases, with overall access time getting faster and the life span of a flash memory being extended.

The flash memory managing unit 108 performs the read/write function on the flash memory directly, and the FML (Flash Mapping Layer) 109 maps the logical address of file data to the physical address of the flash memory so it looks like the disk is in use to the upper layer. The region this mapping information is stored in is the BMT (Block Mapping Table) of the segment of FIG. 2, and when the mapping information is modified a new block is allocated and data are stored in the new block.

The cleaner 110 performs function of making free segments in the flash memory 112 according to the cleaning policy and when power is turned off unexpectedly it recovers the data in the flash memory 112 consistently.

Figure 2:
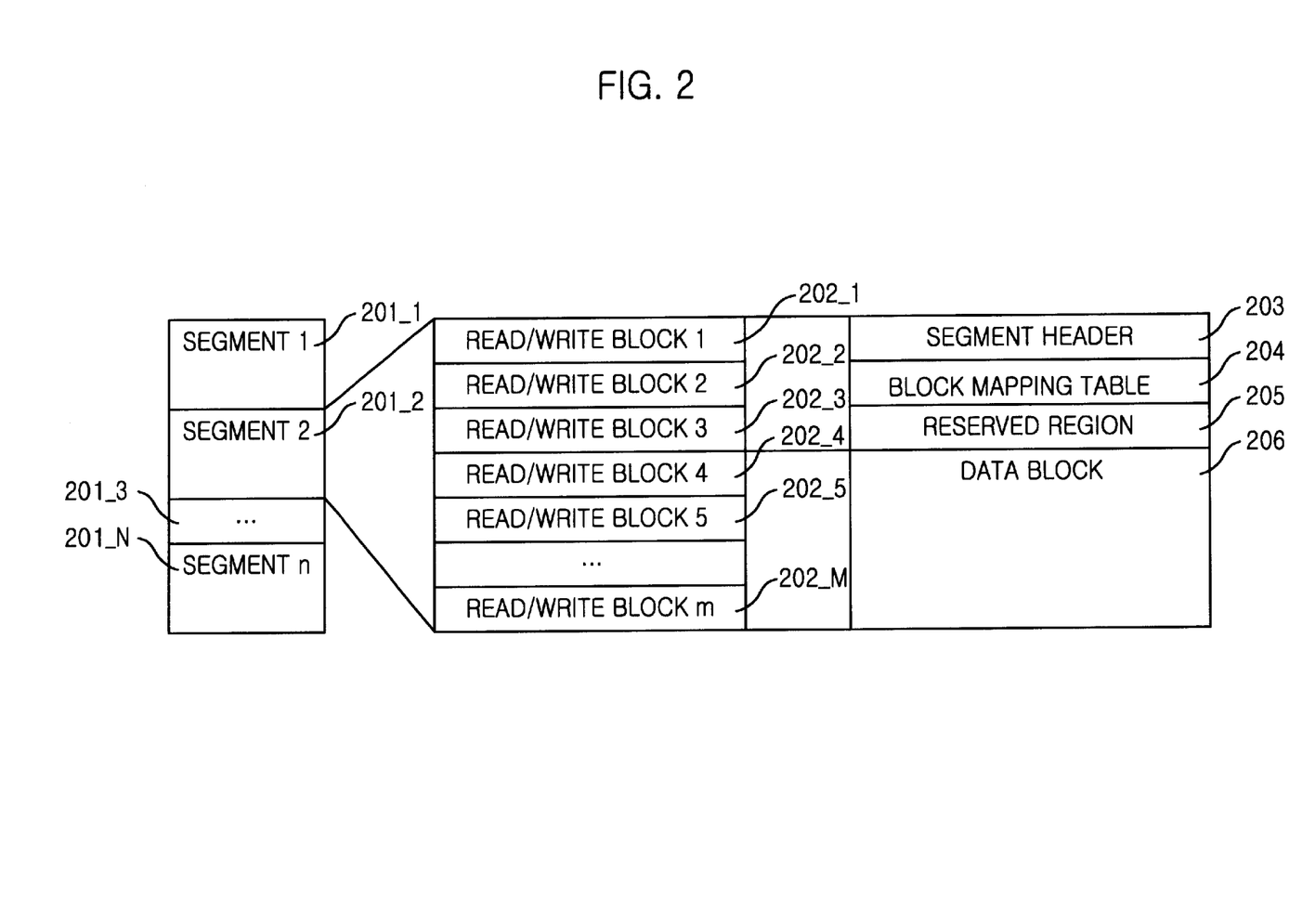
FIG. 2 is a configuration diagram illustrating a flash memory used in a file system in accordance with an embodiment of the present invention.

FIG. 2 is a configuration diagram illustrating a flash memory used in the file system in accordance with an embodiment of the present invention.

The space of the flash memory that can be cleaned at a time is fixed to a predetermined volume, and the number of times cleaning the flash memory is limited to about 100,000 times at normal temperature.

As shown in FIG. 2, accordance with invention, the flash memory 112 comprises a number of segments 201-1, 201-2 . . . 201-N. Generally, the space of the flash memory to be cleaned at one try is called a segment 201, although there is a difference between manufacturers, generally one segment 201 is 128 Kbytes or 64 Kbytes wherein a sector block of a disk, which is usually 512 Bytes, can be stored several times. One segment can store 256 blocks normally.

As seen in FIG. 2, read/write blocks 202 are allocated in the size of an ordinary sector.

when the flash memory 112 is accessed, data is usually read and written as the unit of these read/write blocks 202. When the blocks are erased, they are free. If data is stored in the blocks. And if data is useless, they become invalid blocks. The state of these blocks is expressed in a block mapping table (BMT) 204.

Each of the segments 201-1, 201-2 . . . 201-N comprises a segment header 203, a block mapping table 204, a reserved region 205 and a data block 206. The segment header 203 manages the information of its present status. And the block mapping table 204 administrates mapping information on logical addresses and physical addresses of the blocks stored in the segments 201-1, 201-2 . . . 201-N and information on the status of the blocks.

The reserved region 205 exists for adjusting the size of the blocks and no for other purposes. The remaining blocks are used for data blocks 206. Regardless of being the block containing the segment header 203 or the one with the BMT when modified, the block in the segment 201 are stored in another free block.

Information stored in the segment header 203 includes logical SN, the logical number of the present segment; block size, the size of a read/write block; the number of free blocks, the number of free block available; flags, flags on block allocation information and the like; the BMT offset, offset address for the location the BMT is stored in; segment status, status information for the recovery of power error caused while cleaning the segment; and erasing time, the time that has passed since the segment is cleaned.

Information stored in the BMT 204 includes a logical block number, the number of the logical block for each physical block; and block status, the status of each block.

In the BMT 204, the read/write block is in one of free, valid, invalid, allocated, prevalid, bad and control statuses.

Here, in the information on the block status, 'free' means an empty block for new storage; 'valid,' a block containing useful data; 'invalid,' data in the block is not useful any more so they will be deleted later; 'allocated,' being used for recovery, the status before storage when valid data are yet copied before being copied; 'prevalid,' being used for recovery, but the status when valid data have been stored actually but not approved yet; 'bad,' unusable block; 'control,' a block for storing information for the BMT and the like.

With this structure of a flash memory seen above, when there gets to be no more free block left after repeated storage and cleaning of data, some segment needs to be cleaned to arrange free blocks. So, the cleaner 110 should operate to keep a predetermined number of free segments before they fall below the number. This procedure is called cleaning policy.

Unlike the conventional cleaning policy where the segment with most invalid blocks are cleaned, the present invention considers life span of the flash memory and presents ranked cleaning policy to distributing cleaned segments evenly in the flash memory.

After calculating the rank value of each segment from the following formula 2, the ranked cleaning policy ranks the values of segments high to low and cleans as many segments as needed.

$$R = A \frac{\text{age} \cdot i}{2v \cdot f} \qquad \text{[Formula 2]}$$

Here, v is the ratio of valid blocks to the entire segment; 2v, the cost for reading and moving a valid block it to another segment; f, the ratio of free blocks; i, the ratio of invalid blocks; and age, the time that has passed since the segment is cleaned.

Also, A, the weight for i/f, determines where to put relative importance between invalid blocks and valid blocks. When performing cleaning, free blocks are used without going through cleaning procedures. If the flash memory has still long life, the A value can be made big to put relative importance on the i value, but if it has short life, the A value can be made small putting importance on the f value in order to make full use of free blocks.

Using the R values calculated from the formula 2, cleaning procedure begins to perform on the segment with the biggest R value.

Here, one thing to mind is that to clean a segment its valid blocks should be moved to free blocks of another segment. This means that there should be sufficient amount of other free segments and free blocks. So, in case the number of free segments is less than a predetermined volume, $N_2$, the cleaner should operate to keep more than $N_2$ number of free segments. This procedure is conducted repeatedly at regular intervals, or if the flash memory stops not being used for a predetermined time, it is considered to be idle time and the cleaner operates to clean a segment.

However, when the number of free segments decreases and becomes less than a predetermined number $N_1$, free segments should be made quickly. When $N_2$ numbers of free segments are not secured by this ranked cleaning policy, the flash memory is considered to have reached its limit.

The ranked cleaning policy has the cleaner check the number of free segments periodically when data is stored in the flash memory.

If there are more than $N_2$ numbers of free segments the ranked cleaning policy is not performed and thus the cleaner does not operate. If there are less than $N_2$ numbers of free segments, the ranked cleaning policy is performed and thus the cleaner operates. Here, rank values R are calculated for each segment, and the cleaning procedure is performed first to the segment with the biggest rank value. When free segments are generated more than $N_2$, the cleaning procedure finishes.

Figure 3:
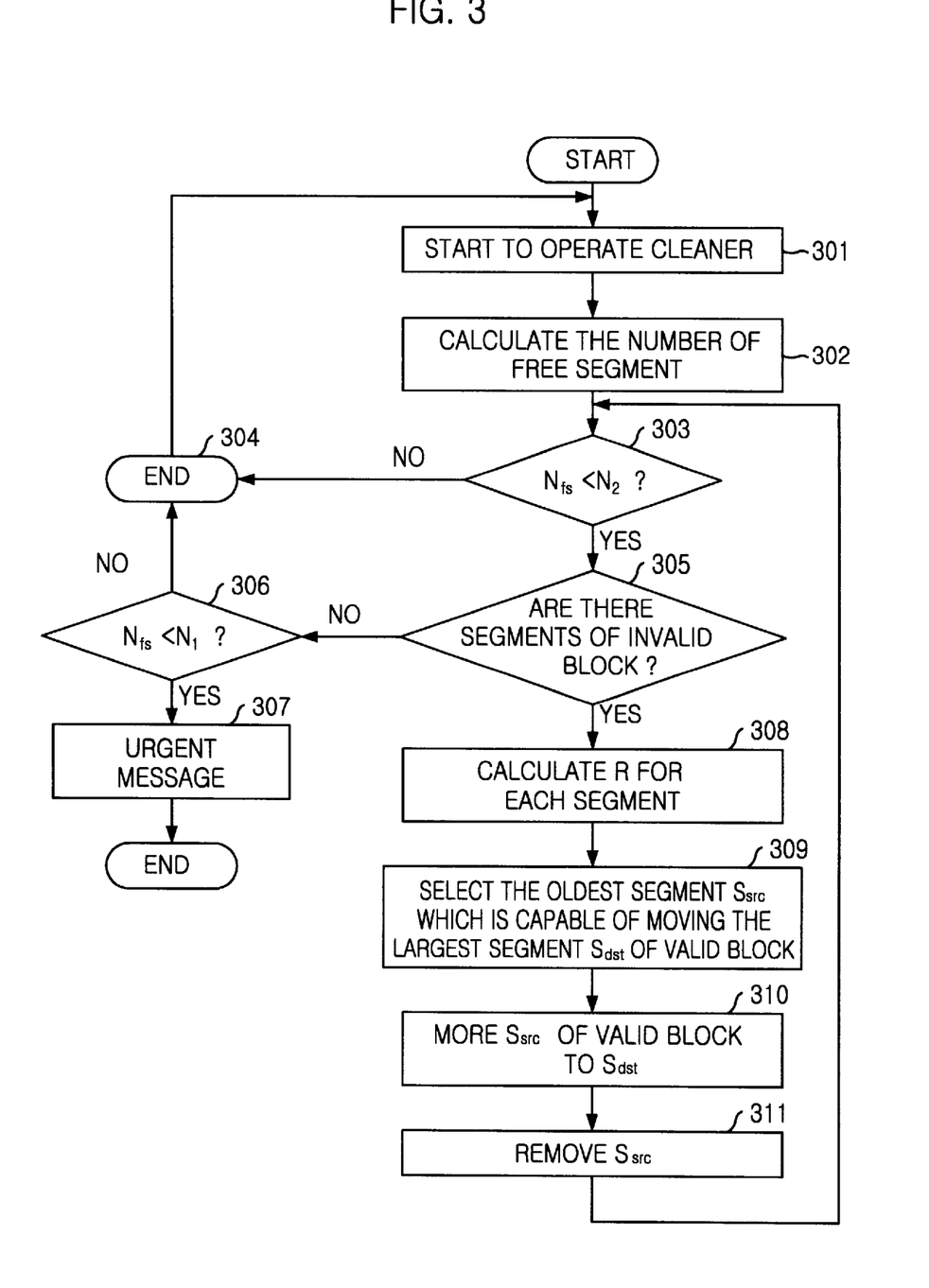
FIG. 3 shows a flow chart of a ranked cleaning policy method for error recovery in accordance with an embodiment of the present invention.

FIG. 3 shows a flow chart of ranked cleaning policy method for error recovery in accordance with an embodiment of the present invention.

At step 301, periodically or when the system is idle, the cleaner operates.

First, at step 302, the cleaner figures out the number of free segments $N_{fs}$ among the segments of the flash memory, and at step 303, sees if the number of free segments $N_{fs}$ is less than $N_2$.

At step 304, if the number of free segments $N_{fs}$ turns out to be more than $N_2$, the procedure terminates because there is enough space.

At step 305, if the number of free segments $N_{fs}$ turns out to be less than $N_2$, the procedure of cleaning segments is conducted, checking if there are segments with invalid blocks to be cleaned, because there is no space enough to store new data in the flash memory.

At step 306, if the result of the step 305 shows no segments with invalid blocks, which means there is no segment to clean, the cleaner compares $N_{fs}$ with $N_1$ which is the minimum number of segments for moving blocks, and sees if the flash memory is full. At step 307, if $N_{fs}$ turns out to be smaller than $N_1$ ($N_{fs}<N_1$), a message requesting to take necessary steps is sent to the user instantly because the flash memory is full. If $N_{fs}$ turns out to be bigger than $N_1$ ($N_{fs}>N_1$), the cleaner stops operating because there is space yet in the flash memory and has the remaining flash memory space used.

At step 308, in case the result of the step 305 shows presence of invalid blocks, rank values R for all segments are calculated.

At step 309, the segment with the largest rank value $S_{src}$ is searched for, and the oldest segment $S_{dst}$ with sufficient space to accommodate valid blocks of the source segment $S_{src}$ is selected in order to clean the segment with the biggest rank to be a free segment. At step 310, valid blocks of the $S_{src}$ are moved to the oldest segment $S_{dst}$ and at step 311 the $S_{src}$ is cleaned.

Then, going back to step 303 and it is checked if there is sufficient space in the flash memory again.

The ranked cleaning policy described above maximizes life span of a flash memory by extending segment-cleaning time as much as possible and arranging cleaned segments evenly in the flash memory.

Figure 4:
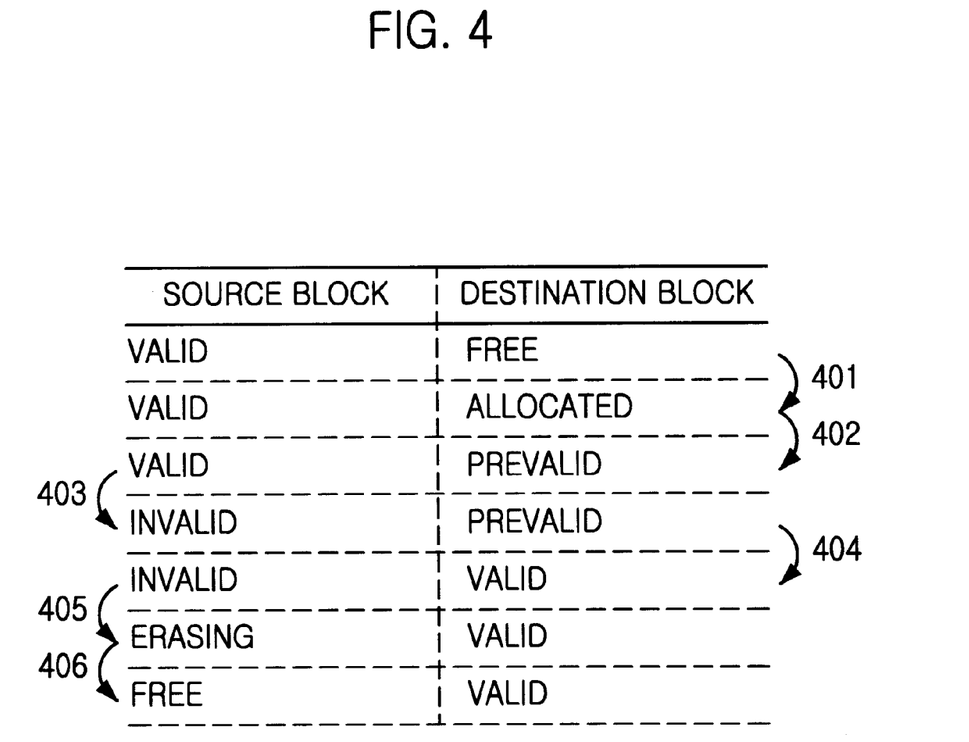
FIG. 4 is a diagram showing a method for copying a segment in the cleaning policy procedures in accordance with an embodiment of the invention.

FIG. 4 is a diagram showing a method for copying a segment in the cleaning policy procedures in accordance with an embodiment of the invention.

As shown in FIG. 4, the present invention adds allocated and prevalid statuses for blocks to the procedure of copying valid blocks to make error recovery done easily.

First at step 401, to clean a segment, a free block where the source valid block will be moved is searched for, and it is converted to the allocated status.

At step 402, the original data are copied to the destination block in the allocated status, and the destination block is converted to the prevalid status.

At step 403, as the source block is copied without any trouble and becomes unnecessary any more, it should be converted to the invalid status. At step 404, as the destination block has the data coming from the source block, it is now converted to the valid status.

At step 405, after the steps 401 to 404 are performed for all the valid blocks in the segment to be cleaned, the procedure of cleaning segment is conducted.

At step 406, the cleaned segments are converted to free segments.

Figure 5:
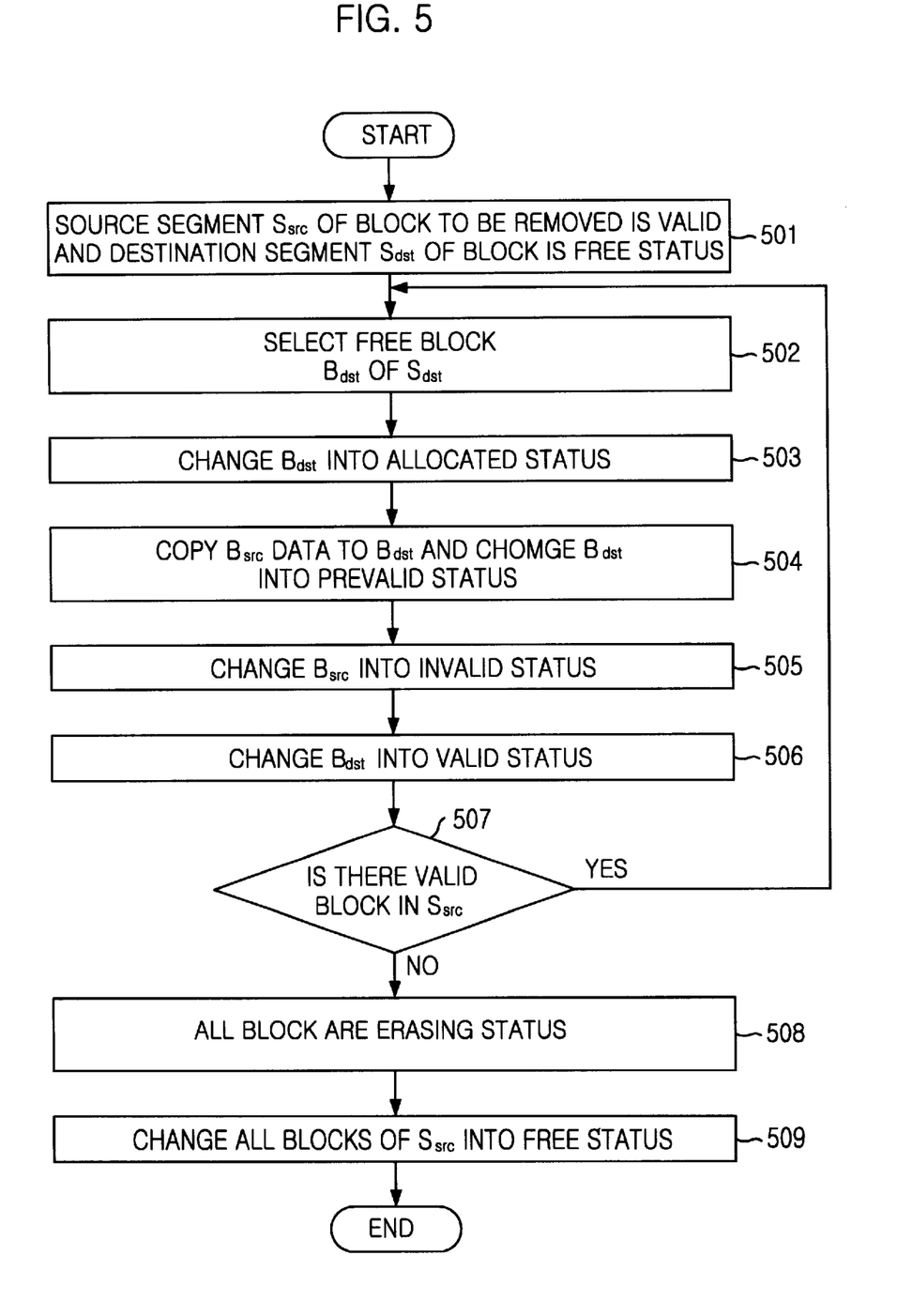
FIG. 5 is a detailed flow chart illustrating a method for copying a segment in the cleaning policy procedures in accordance with an embodiment of the invention.

FIG. 5 is a detailed flow chart illustrating a method for copying a segment in the cleaning policy procedures in accordance with an embodiment of the invention.

First at step 501, all blocks of the source segment $S_{src}$ are in valid status and the target segment $S_{dst}$ has sufficient free blocks.

At step 502, to move valid blocks of the source segment $S_{src}$ thereto one by one, free blocks $B_{dst}$ are searched for in the destination segment $S_{dst}$, and at step 503 the free blocks $B_{dst}$ found are converted to the allocated status.

At step 504, one valid block $B_{src}$ of the source segment $S_{src}$ is copied to the block converted to the allocated status $B_{dst}$, and then the $B_{dst}$ is converted to the prevalid status. At step 505, the status of the source block $B_{src}$ is turned invalid, and then at step 506 the $B_{dst}$ is converted to the valid status.

The reason going through as many steps as shown above is to distinguish in what step power error occurs when it is caused.

At step 507, it is checked whether there are valid blocks left in the source segment $S_{src}$, as it has to be cleaned.

If the check result shows any valid blocks left in the source segment $S_{src}$, the procedure returns to step 502, taking the steps from 502 to 506 in order to move out all the valid blocks left.

At step 508, if the check result shows no valid blocks left in the source segment $S_{src}$, the segment is cleaned. As this step concerns erasing, the blocks in this segment are converted to the erasing status.

At step 509, after cleaning all the blocks in the source segment $S_{src}$, they become to be in the free status.

Figure 6:
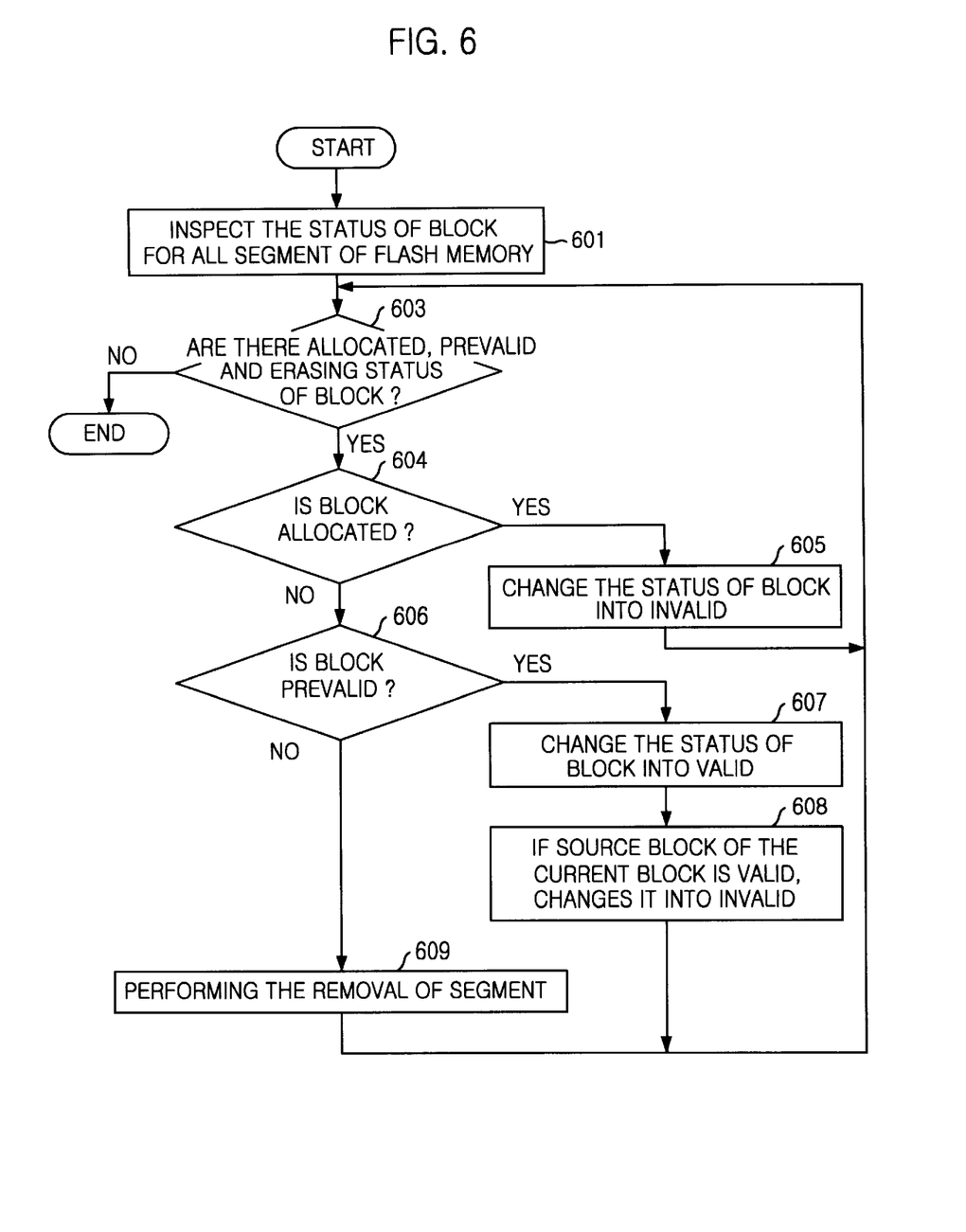
FIG. 6 depicts a flow chart of a method for recovering power error in an embodiment of the present invention.

FIG. 6 depicts a flow chart of a method for recovering power error in an embodiment of the present invention.

In case power error occurs in the cleaning procedures of FIGS. 4 and 5, the appliance adopting the flash memory file system gets restarted, checking the segment status of the flash memory, and according to the checked condition, it conducts recovery procedures as following.

When error occurs in step 401 of FIG. 4, the source block is in valid status and the destination block is in free status so you just leave them as they are.

When error occurs in the step 402, the destination block is in allocated status and wrong data may be in the destination block because the original data were being copied. So, the destination block needs to be converted to the invalid status, leaving the source block in valid status as it is. Later the source block should be moved to another free block.

When error occurs in the step 403, the destination block is in valid status and the destination block is in prevalid status. With the original data all having been copied to the destination block, the source block should be converted to the invalid status while the destination block is turned to the valid status.

When error occurs in the steps 404 to 406, the destination block is in invalid status and the destination block falls in either prevalid or valid status with all the original data that have been copied. The source block, which has become invalid takes cleaning steps and the destination block should be changed valid.

Referring to FIG. 6, the power error recovery procedures above will be described in detail hereinafter.

At step 601, when an appliance gets restarted due to power error, it examines the block status of all segments in the flash memory.

At step 603, it is checked if there are blocks in instable statuses such as allocated, prevalid and erasing statuses other than normal and stable statuses, e.q., free, valid and invalid statuses.

If the check result shows no instable block, the procedures terminates because there is no object to recover. At step 604, if there are blocks in one of the three instable statuses, it is first checked if it is in allocated status.

In case that instable status is allocated status, the destination block should be converted invalid because the allocated status means error has occurred in the middle of copying data from the source block, and after invalidating the data at step 605, the procedures return to the step 603 and check again if there are blocks in instable status at step 603.

Secondly, at step 606 it is checked if the instable status is the prevalid status. If it is, the original data have been all copied and the destination block is in the course of being converted from valid to invalid status. So, at step 607 the prevalid status should be converted to the valid status and finding the source block, if it is still valid, it should be changed to be invalid, otherwise, at step 608 leave it as it is. This is the case when error has occurred in the step 403 or 404 of FIG. 4.

Finally, at step 609 it is checked if there are blocks in erasing status and if there are, the erasing procedures should be performed again because error has occurred which erasing the segment.

The above procedures should be performed as long as instable blocks are found out.

The error recovery method as described above is applicable to embedded systems, which have high chances of sudden power error and have to keep data after power is turned off. That is, it can be comprehensively applied to copying or storing data in flash memories, EEPROM and the like.

The present invention described above can be embodied in a program and stored in a computer-based recording media such as CD ROMs, RAMs, ROMs, floppy disks, hard disks, optical magnetic disks and so on.

The present invention presents a file system structure employing a flash memory and describes the method of storing data in the flash memory of the file system.

The present invention can extend life span of a flash memory by segmenting it and adopting ranked cleaning policy, and improves the speed of the overall file system by using the space of the flash memory evenly and reducing the number of times cleaning it.

Also, while conducting the ranked cleaning policy, this invention prevents data damage by recovering the error of inconsistency caused by sudden power-off in operation, which makes us to use data in embedded systems more safely and confidently.

While the present invention has been described with respect to certain preferred embodiments, it will be apparent to those skilled in the art that various changes and modifications may be made without departing from the scope of the invention as defined in the following claims.

What is claimed is:

1. A method for ranked cleaning using a flash memory used in a file system, the method comprising the steps of:
   a) calculating rank values for all segments of the flash memory periodically; and
   b) if the storable space of the flash memory becomes less than a predetermined volume, a cleaner operating to clean invalid space of segments in order of their rank values obtained in the previous step high to low and thus to secure new storage space,
   wherein the rank values are calculated by an equation expressed as:

$$R = A \frac{\text{age} \cdot i}{2v \cdot f}$$

where v is the ratio of valid blocks to the entire segment, f is the ratio of free blocks in a segment, i is the ratio of invalid blocks, age is the time that has passed since the segment is cleaned, and A is the weight.

2. The method of claim 1, wherein
   the flash memory of the step a) is divided into a predetermined number of segments, a segment being the space that can be cleaned at a time;
   the segment is divided into read/write blocks; and
   the read/write block includes a segment header, BMT (Block Mapping Table) and data blocks.

3. The method as recited in claim 1, wherein in the step b) includes the steps of:
   c) the cleaner examining the number of free segments in the flash memory $N_{fs}$, and checking whether the examined number of free segments is less than the predetermined number of segments;
   d) if the number of free segment is more than the predetermined number of segments, the cleaner stopping operation as there is sufficient space;
   e) if the number of free segment is less than the predetermined number of segments, the cleaner examining if there are segments with invalid blocks to be cleaned; f) if there are segments with invalid blocks, securing new space for storage by cleaning segments with invalid blocks with biggest rank value calculated in step a); and
   g) if there is no segment with invalid blocks, checking if the flash memory is full, and in case it's full, notifying it to the user and in case it's not full, the cleaner stopping operation because the remaining flash memory space can be used.

4. The method of claim 3, wherein, in the step f) of cleaning segments with invalid blocks, the oldest segment with sufficient space to accommodate the valid blocks of a segment to be erased is selected and the valid blocks are copied to the selected segment and the segment targeted for cleaning is erased.

5. The method of claim 4, wherein the procedure of cleaning the segment to be erased includes the steps of:
   h) looking for the destination block where the valid blocks of the source segment to be erased will be moved, and converting it to the allocated status;
   i) after the original data are copied to the destination block which has been converted to the allocated status in the step h), the destination block being converted to the prevalid status with the source block no longer in need converted to invalid status, then making the destination block converted to valid status; and
   j) conducting the cleaning procedure to the target segment of deletion, the source segment and converting it to a free segment.

6. The method of claims 2, wherein in the step b) includes the steps of:
   c) the cleaner examining the number of free segments in the flash memory $N_{fs}$, and checking whether the examined number of free segments is less than the predetermined number of segments;
   d) if the number of free segment is more than the predetermined number of segments, the cleaner stopping operation as there is sufficient space;

e) if the number of free segment is less than the predetermined number of segments, the cleaner examining if there are segments with invalid blocks to be cleaned;

f) if there are segments with invalid blocks, securing new space for storage by cleaning segments with invalid blocks with biggest rank value calculated in the step a); and g) if there is no segment with invalid blocks, checking if the flash memory is full, and in case it's full, notifying it to the user and in case it's not full, the cleaner stopping operation because the remaining flash memory space can be used.

7. The method of claim 6, wherein, in the step f) of cleaning segments with invalid blocks, the oldest segment with sufficient space to accommodate the valid blocks of a segment to be erased is selected and the valid blocks are copied to the selected segment and the segment targeted for cleaning is erased.

8. The method of claim 7, wherein the procedure of cleaning the segment to be erased includes the steps of:

h) looking for the destination block where the valid blocks of the source segment to be erased will be moved, and converting it to the allocated status;

i) after the original data are copied to the destination block which has been converted to the allocated status in the step h), the destination block being converted to the prevalid status with the source block no longer in need converted to invalid status, then making the destination block converted to valid status; and j) conducting the cleaning procedure to the target segment of deletion, the source segment and converting it to a free segment.

9. The method of claims 1 wherein in the step b) includes the steps of:

c) the cleaner examining the number of free segments in the flash memory $N_{fs}$, and checking whether the examined number of free segments is less than the predetermined number of segments;

d) if the number of free segment is more than the predetermined number of segments, the cleaner stopping operation as there is sufficient space;

e) if the number of free segment is less than the predetermined number of segments, the cleaner examining if there are segments with invalid blocks to be cleaned;

f) if there are segments with invalid blocks, securing new space for storage by cleaning segments with invalid blocks with biggest rank value calculated in the step a); and g) if there is no segment with invalid blocks, checking if the flash memory is full, and in case it's full, notifying it to the user and in case it's not full, the cleaner stopping operation because the remaining flash memory space can be used.

10. The method of claim 9, wherein, in the step f) of cleaning segments with invalid blocks, the oldest segment with sufficient space to accommodate the valid blocks of a segment to be erased is selected and the valid blocks are copied to the selected segment and the segment targeted for cleaning is erased.

11. The method of claim 10, wherein the procedure of cleaning the segment to be erased includes the steps of:

h) looking for the destination block where the valid blocks of the source segment to be erased will be moved, and converting it to the allocated status;

i) after the original data are copied to the destination block which has been converted to the allocated status in the step h), the destination block being converted to the prevalid status with the source block no longer in need converted to invalid status, then making the destination block converted to valid status; and j) conducting the cleaning procedure to the target segment of deletion, the source segment and converting it to a free segment.

12. A computer-based recording medium for recording a program in file systems with a processor for conducting ranked cleaning policy, the functions of:

a) calculating rank values for all segments of the flash memory periodically; and b) if the storage space of the flash memory become less than a predetermined volume, the cleaner operating to secure new space by cleaning invalid space of the segment in order of their rank value high to low wherein the rank values are calculated by an equation expressed as:

$$R = A \frac{\text{age} \cdot i}{2v \cdot f}$$

where v is the ratio of valid blocks to the entire segments, f is the ratio of free blocks in a segment, i is the ratio of invalid blocks, age is the time that has passed since the segment is cleaned, and A is the weight.

* * * * *